June 10, 1941. P. B. DRANE 2,244,986
DIVERTING VALVE
Filed Feb. 28, 1940

Phillips B. Drane
INVENTOR

ATTORNEY

Patented June 10, 1941

2,244,986

UNITED STATES PATENT OFFICE 2,244,986

DIVERTING VALVE

Phillips B. Drane, Tulsa, Okla.

Application February 28, 1940, Serial No. 321,304

6 Claims. (Cl. 137—68)

The invention relates to diverting valves of the types used in connection with oil storage tank systems, and has for its object to provide angularly disposed seats, one in the main line and one in a branch line leading to a tank, and with which seats disc valves cooperate for allowing flow through the oil line or diverting the flow into the tank.

A further object is to hingedly mount the disc valves so they will have limited outward movement in relation to each other, and to provide spring means interposed between the valves for normally forcing the same to their outward limited relation, and to provide in connection with the disc valve cooperating with the branch pipe seat a weighted trip latching arm cooperating with a shoulder in the branch line for maintaining the branch line open, and spring pressure on the disc valve cooperating with the seat in the supply line.

A further object is to provide a trip rod, float controlled, and cooperating with the latching arm for disengaging said arm from the latching shoulder and allowing the branch line valve to close and the supply line valve to open when the liquid level in the tank reaches a predetermined point.

A further object is to provide means located outside the valve casing, whereby the operator can open the branch line valve and close the supply line valve.

A further object is to provide cooperating limiting stops carried by the valves so that the supply line valves will be unseated and moved to open position when the branch line valve is tripped and closed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figures 1, 2, 3:
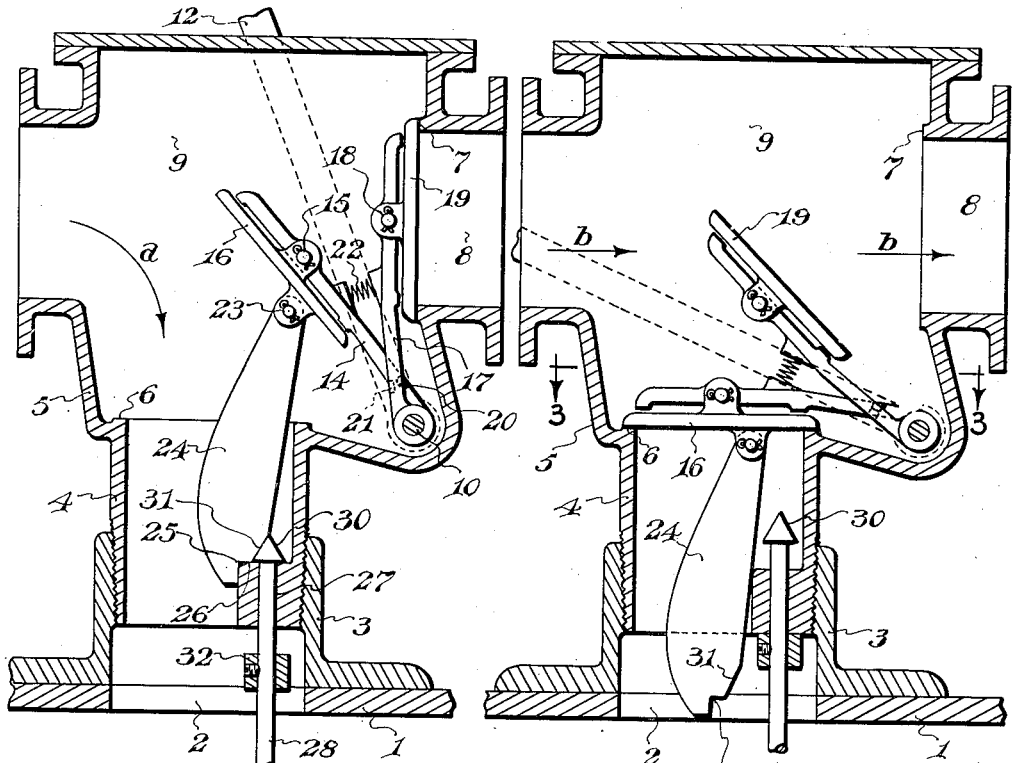
Figure 1 is a vertical longitudinal sectional view through the diverting valve and a portion of a tank showing the branch valve open and the supply line closed.
Figure 2 is a view similar to Figure 1, taken on line 2—2 of Figure 3, showing the branch valve closed and the supply line open after the tripping operation.
Figure 3 is a horizontal view taken on line 3—3 of Figure 2.

Referring to the drawing, the numeral 1 designates the top of a conventional form of oil storage tank and 2 a filling opening therein. Extending upwardly and surrounding the filling opening is an internally threaded sleeve 3, in which sleeve is threaded a downwardly extending branch pipe 4. The branch pipe 4 is carried by the valve casing 5 and provided at its upper end with a seat 6 at substantially a right angle to the seat 7 in the oil supply line 8. Although only one diverting valve is shown, it is obvious a number of valves are to be used in connection with a number of tanks to be filled from a main line.

Rockably mounted in the lower end of the valve casing chamber 9 is a transversely disposed rock shaft 10, one end of which rock shaft extends through a stuffing gland 11 and to the outside of the casing 5, and on which last named end of the shaft is a weight lever 12 which forms means in assisting in the closing of the branch line and manual means whereby the branch line may be opened and the supply line closed when desired. Secured on the shaft 10 by means of a set screw 13 is an outwardly extending arm 14 having rockably mounted at 15, thereon, a disc valve 16 which cooperates with the branch line seat 6. Rockably mounted on the shaft 10 is an upwardly extending arm 17, which has rockably mounted at 18, thereon, the supply line disc valve 19 which cooperates with the valve seat 7. The arms 14 and 17 are provided with limit lugs 20 and 21 which limit the outward movement of the arms in relation to each other under the influence of the expansion spring 22 interposed between the arms. It will be noted that when the valve 19 is seated, as in Figure 1, the lugs 20 and 21 are spaced, consequently the expansion spring 22 is exerting a seating pressure on the valve 19.

Hingedly connected at 23 to the outer face of the branch pipe valve 16 is a downwardly extending weighted latching arm 24, the lower end of which is provided with a notch 25 for the reception of a latching shoulder 26. It will be noted, by referring to Figure 1, when the valve 16 is open for diverting the fluid through the branch pipe in the direction of the arrow a, the weighted latching arm 24 will hold the valve 16 open and the valve 19 closed. This position may be manually assumed or set by the manipulation of the weight arm or lever 12.

Slidably mounted in a bearing 27 of the shoulder 26 is a float controlled rod 28 which extends downwardly into the tank and is provided with a float 29 adapted to be moved upwardly when the liquid level reaches a predetermined point as shown in Figure 2, and at which time the conically shaped head 30, carried by the upper end of the rod in engagement with the bevelled shoulder 31, will swing the lower end of the latching arm 24 outwardly to clear the shoulder 26 and will allow the weight of the lever and the weighted arm 12 to move the valve 16 downwardly to seated engagement with the seat 6 of the branch pipe and open the main line, allowing the fluid to continue through the main supply pipe in the direction of the arrow b to other tanks, according to the setting of their diverting valves. Adjustably mounted on the float rod 28 is a limit collar 32 which cooperates with the under side of the tripping lever shoulder 26 for limiting the upward movement of the conical head 30. It will be noted that when the liquid level drops the float will be suspended above the liquid in the tank until it is again moved by the filling of the tank incident to a further manual resetting or latching of the diverting valve.

From the above it will be seen that a double acting diverting valve is provided which is simple in construction, and one wherein the main line valve is spring pressed when the branch line valve is latched in open position, thereby obviating chattering of the valve and maintaining the latching arm in engagement with the shoulder 26.

Although the valve seats 6 and 7 have been described as being in substantially right angular position, it is to be understood this may be varied.

The invention having been set forth what is claimed as new and useful is:

1. A float controlled diverting valve comprising a casing having a branch pipe connection with a tank, a supply line valve seat carried by the casing, a valve seat carried by the branch line connection at an angle to the supply line seat, a hinged valve cooperating with the supply line seat, a second independently hinged valve cooperating with the branch line seat, spring means interposed between said valves for normally forcing said valves away from each other, means for limiting the outward movement of the valves in relation to each other, float controlled latching means cooperating with the branch line valve for maintaining the supply line valve seated and the branch line valve unseated, said float controlled latching means when unlatched allowing the branch line valve to close and the supply line valve to open.

2. A device as set forth in claim 1 wherein the limiting means for limiting the outward movement of the valves are movable with the valves and in relation to each other and form means for unseating the supply line valve when the branch line valve moves to closed position.

3. A device as set forth in claim 1 wherein the float controlled latching means comprises a weighted latching arm hingedly connected to the branch line valve, a latching shoulder in the branch line and with which the weighted latching arm engages, a vertically movable float rod carried by the shoulder, a head carried by said rod and shaped to disengage the latching arm from the shoulder upon upward movement of the float rod and head.

4. A device as set forth in claim 1 including a latching arm hingedly connected to the branch line valve, a float controlled rod, a latching shoulder within the branch line and in which the rod is slidably mounted, the free end of said latching arm being notched for the reception of the shoulder, and a latch disengaging head carried by the rod above the shoulder and adapted to engage the free end of the latching arm and disengage the same from the shoulder.

5. A diverting valve comprising a casing having angularly disposed branch line and supply line seats, independently hinged angularly disposed branch line and supply line valves within the casing and cooperating with said seats, spring means interposed between said valves and normally forcing said valves apart, float controlled latching means carried by the branch line valve, said spring means exerting pressure on the supply line valve when seated and when the branch line valve is latched in open position.

6. A device as set forth in claim 5 including hinged arms on which the valves are mounted, lugs carried by said arms in the path of each other for limiting the outward movement of the arms in relation to each other under the action of the spring means and lever means disposed outside the valve casing whereby said supply line valve may be closed and said branch line valve opened and latched for float controlled operation.

PHILLIPS B. DRANE.